Patented Mar. 28, 1950

2,502,327

UNITED STATES PATENT OFFICE 2,502,327

SEPARATION OF ALUMINUM CHLORIDE AND FERRIC CHLORIDE

Ignace J. Krchma, Wilmington, and Holger H. Schaumann, Newark, Del., assignors to E. I. du Pont de Nemours & Company, Wilmington, Del., a corporation of Delaware No Drawing. Application February 18, 1948, Serial No. 9,326

7 Claims. (Cl. 23—93)

This invention relates to a separation process and more particularly to a method for separating aluminum chloride from a substantially anhydrous mixture of ferric chloride and aluminum chloride.

Aluminum chloride is a valuable chemical product for such applications as catalysis, mordanting and pigment treatment. Contamination with an iron salt in these and other uses is detrimental because iron salts impart discoloration in dyeing and pigment applications and reaction variability in catalysis.

In the preparation of aluminum chloride from an aluminiferous ore, vapors of ferric chloride, silicon tetrachloride and titanium tetrachloride may be formed during chlorination from the impurities present in the ore. The first two named chlorides are readily separated from the last two by fractional condensation because their boiling points are considerably higher; but subsequent separation of the aluminum chloride from the ferric chloride cannot thus be effected. Mixtures of anhydrous aluminum and ferric chlorides are also collected when titaniferous materials, containing iron and aluminum values, are chlorinated. The chlorination of contaminated scrap aluminum produces aluminum chloride often containing iron chloride as an impurity.

Aluminum and ferric chlorides normally are sublimable solids. They condense as solids from their vapor state upon cooling; but their subsequent separation by sublimation is very difficult if not practically impossible. Heretofore many other methods have been advanced for effecting this separation. Most of these are based upon conversion of the ferric chloride to the less volatile ferrous salt or to metallic iron by reduction with an active metal. The aluminum chloride is then sublimed from the iron metal or ferrous salt. Such methods are costly, however.

One of the objects of this invention is to provide a method of separating aluminum chloride from a substantially anhydrous mixture of aluminum chloride and ferric chloride. Another object is to provide a method of obtaining aluminum chloride substantially free of ferric chloride impurity. A further object is the solvent extraction of aluminum chloride from a substantially anhydrous mixture of aluminum chloride and ferric chloride, wherein the aluminum chloride is protected from contamination by moisture. Other objects will become apparent as our process is described.

We have found that titanium tetrachloride is a selective solvent for the aluminum chloride component of anhydrous mixtures of aluminum chloride and ferric chloride. Aluminum chloride is soluble to the extent of about 283 grams per liter of $TiCl_4$ at 137° C. and 17 grams per liter at 25° C. Ferric chloride is substantially insoluble in both hot and cold titanium tetrachloride, the solubility being less than about 0.5 gram per liter. These data show the large temperature co-efficient of solubility of aluminum chloride in titanium tetrachloride and the selectivity of the solvent. In our invention we utilize this selective property of titanium tetrachloride for separation into its component parts of a mixture comprising ferric chloride and aluminum chloride.

In a specific embodiment of our invention, the anhydrous mixture of aluminum chloride and ferric chloride is treated in a contacting vessel with the titanium tetrachloride solvent. This contacting vessel may be equipped with means for supplying heat for increasing the temperature of the mixture; means for condensing and returning any vaporized titanium tetrachloride which is released from the mixture by such heating; and means for discharging the solids and the liquid solution resulting from the contacting operation. In the vessel the aluminum chloride is dissolved by the titanium tetrachloride solvent, and the ferric chloride and other insoluble materials remain as solids. After solution is completed, the solids and liquid are discharged from the contacting vessel into a separator, for instance a centrifuge which by centrifugal action separates the undissolved ferric chloride fraction from the titanium tetrachloride solution containing the aluminum chloride. The solution is then discharged into a cooler and crystallizer wherein the temperature is lowered until the aluminum chloride crystallizes out. The contents of the crystallizer are then transferred to another separator which removes the solid aluminum chloride crystals from the titanium tetrachloride solvent. The latter may then be recycled for use in dissolving more aluminum chloride. The two solid products, one composed of ferric chloride, the other of aluminum chloride, are then separately heated to remove adsorbed titanium tetrachloride. The adsorbed solvent is recovered from this operation and combined with the titanium tetrachloride being recycled for further extraction.

The following are typical ferric chloride-aluminum chloride mixtures which are advantageously treated by means of our invention: (All percentages are by weight.)

(1) Solid chlorides condensed from the products of chlorination of Indian titaniferous ore:

| | Per cent |
|---|---|
| $TiCl_4$ | 1.35 |
| $FeCl_3$ | 78.6 |
| $FeCl_2$ | 1.77 |
| Alkaline earth chlorides | 3.38 |
| $AlCl_3$ | 2.51 |
| Residue (coke-ash, etc.) | 12.40 |

(2) Solid chlorides condensed from the products of chlorination of slag from titaniferous-iron ore:

| | Per cent |
|---|---|
| $MgCl_2$ | 3.0 |
| $FeCl_3$ | 58.1 |
| $AlCl_3$ | 28.5 |
| Residue (coke-ash, etc.) | 10.4 |

(3) Impure $AlCl_3$:

| | Per cent |
|---|---|
| $AlCl_3$ | 89.0 |
| $FeCl_3$ | 7.5 |
| Residue (oxides and ash) | 3.5 |

The following examples are illustrative of the mode of our invention and are meant in no way to be limitative thereof: (All parts are by weight).

*Example I*

100 parts of the mixture of ferric chloride and aluminum chloride given as type (1) above, were extracted with an equal weight of titanium tetrachloride. This operation was carried out in a vessel equipped with a reflux condenser, and agitator and heating means. The mixture of solids and titanium tetrachloride was heated to between about 100° and 137° C. and agitated for about 15 minutes. After this treatment with the solvent, the solids were allowed to settle and the hot liquid portion was removed. About 80 parts of $TiCl_4$ solution were obtained. This hot $TiCl_4$ containing the $AlCl_3$ was transferred to a distillation unit and the $TiCl_4$ was distilled over and condensed in a collection vessel. This step, advisable when the $AlCl_3$ content of the starting material is low, was carried out to make the recovery of $AlCl_3$ substantially complete. Since the volume of solvent used was low, the amount of $FeCl_3$ contamination remaining in the $AlCl_3$ was also low. The ferric chloride solid residue remaining after the extraction contained some adsorbed titanium tetrachloride. This residue was separately treated by heating in a distillation vessel equipped with a water-cooled condenser. The adsorbed titanium tetrachloride was distilled from the solids, and the last trace was removed by blowing dry air through the distillation outfit. These operations gave the following products:

(A) $FeCl_3$ portion—96.2 parts containing about .6% $AlCl_3$.

(B) $AlCl_3$—1.9 parts containing less than 1.0% $FeCl_3$.

$AlCl_3$ recovery about $1.9/2.5 = 76\%$ and in relatively pure condition.

*Example II*

100 parts of the solid chloride condensation product from the chlorination of a titaniferous ore slag, type (2) above, were added to the contacting vessel used in Example I. 173 parts of titanium tetrachloride were also added. This mixture was stirred and heated until the aluminum chloride content was dissolved. The hot products were then separated by filtration to yield a solid mass containing the ferric chloride and a solution containing the aluminum chloride. The solid mass was treated again in the same way using 86 parts of $TiCl_4$. The two titanium chloride-aluminum chloride solutions were combined and subsequently cooled to 20° C. to crystallize out aluminum chloride. The aluminum chloride crystals were then separated from the titanium tetrachloride solvent by filtration. The two solid products of $FeCl_3$ and $AlCl_3$ were separately treated by heating in a distillation unit as was done for the $FeCl_3$ in Example I, to remove adsorbed titanium tetrachloride. The yield of this experiment is shown by the following table:

$FeCl_3$ fraction, 73 parts contained 2.1% $AlCl_3$.
$AlCl_3$ fraction, 24.9 parts contained less than .28% $FeCl_3$.
$TiCl_4$ solvent (to be recycled), 260 parts contained about .76% $AlCl_3$.
$AlCl_3$ yield $= 24.9/28.5 = .875 \times 100 = 87.5\%$.

*Example III*

100 parts of impure $AlCl_3$ of type (3) above were added to the vessel as in Example I, heated, refluxed and stirred with 605 parts of $TiCl_4$. After this treatment the hot liquid portion was removed. About 680 parts of a $TiCl_4$ solution of $AlCl_3$ were obtained, free of the $FeCl_3$ undissolved solids. This solution was cooled to 25° C. to crystallize out the $AlCl_3$. The solid $AlCl_3$ and liquid $TiCl_4$ were separated by centrifuging. The solids were separately treated as above to remove the adsorbed titanium tetrachloride. The yields in this experiment are tabulated below:

83 parts $AlCl_3$ containing less than .2% $FeCl_3$.
11.5 parts of solid residue containing the $FeCl_3$.
600 parts of $TiCl_4$ containing about .96% $AlCl_3$.
This solvent to be recycled.
$AlCl_3$ recovery $83/89 = .94 \times 100 = 94\%$.

The method of our invention is applicable to mixtures of ferric chloride and aluminum chloride produced from many different operations. Mention has been made of impure aluminum chloride and of products of chlorination of titaniferous ores or slags containing iron and aluminum. Other chlorination products from raw materials such as aluminous clays containing titanium and iron values or from any operation where anhydrous iron and aluminum chlorides are obtained, may be advantageously treated by our new method.

The individual operations in our invention may take on widely different variations. The leaching phase can be carried out in various types of equipment and may include steps of mixing, grinding, washing, percolating and leaching. The main element is to insure adequate solubility of the aluminum chloride in the $TiCl_4$. The temperatures used in the operation may be varied when limited by available heating and/or cooling agent temperatures. Of course, some leaching wil be effected at as low as 25° C., where $AlCl_3$ is soluble to the extent of 17 g./l.; and conversely, some crystallization from a solution saturated at say 137° C., will occur upon cooling even slightly below that temperature. It is preferred to operate at above 100° C. for solubilizing and below 50° C. for crystallizing, however, because the amount of purified $AlCl_3$ obtained per operation, and thus the practical economics of the process, will depend, with a given amount of solvent, upon this temperature difference. Treatments at temperature above about 137° C. need to be conducted under pressure because of the volatility of the TiCl4. The two separations of solid-liquid mixtures may be carried out by various well known procedures including settling, filtering, centrifuging and thickening. The crystallization step may be varied by changing the temperature and rate of cooling to effect changes in the type of aluminum chloride crystals obtained. Care must be exercised during all operations to insure elimination of moisture from the reaction vessels because of the extreme reactivity of all materials with water. Our invention may be carried out in either batch or continuous fashion. It is apparent that multiple purification operations on the same charge will result in a very pure AlCl3 product, and that the number of such operations will depend on economic considerations.

We claim:

1. A method of removing aluminum chloride from an anhydrous mixture comprising aluminum chloride and ferric chloride which comprises dissolving the aluminum chloride in titanium tetrachloride.

2. A method of separating aluminum chloride from an anhydrous mixture comprising aluminum chloride and ferric chloride which comprises leaching the said mixture with heated titanium tetrachloride, separating the resulting solution of aluminum chloride in titanium tetrachloride from the undissolved ferric chloride fraction, and recovering the aluminum chloride by cooling the solution.

3. A method of separating aluminum chloride and ferric chloride which comprises contacting a mixture of said chlorides with titanium tetrachloride solvent, heating to above 100° C., separating the undissolved ferric chloride, cooling the solution to below 50° C. and removing the aluminum chloride crystals from the solvent.

4. A method of purifying impure anhydrous aluminum chloride containing ferric chloride which comprises dissolving the aluminum chloride in heated titanium tetrachloride, separating the undissolved material, cooling the solution to crystallize out the aluminum chloride, and subsequently freeing the aluminum chloride crystals of TiCl4.

5. In a method for purifying substantially anhydrous impure AlCl3, the steps of dissolving the AlCl3 in heated TiCl4 and separating the TiCl4-AlCl3 solution from the undissolved material.

6. A method for recovering aluminum chloride from an anhydrous mixture with ferric chloride which comprises contacting said mixture at an elevated temperature with titanium tetrachloride solvent, and until the aluminum chloride becomes dissolved in said titanium tetrachloride, separating the resulting hot solution of aluminum chloride in titanium tetrachloride from the undissolved ferric chloride, cooling said solution to below 50° C. and recovering the aluminum chloride crystals from the solvent.

7. A method for recovering aluminum chloride from an anhydrous mixture with ferric chloride which comprises subjecting said mixture to contact with titanium tetrachloride at temperatures ranging from about 100–137° C. with accompanying agitation for a period of about 15 minutes, separating the undissolved ferric chloride from the resulting solution of aluminum chloride in titanium tetrachloride, and thereafter recovering said aluminum chloride from said solution by cooling the latter to below 50° C. and removing the aluminum chloride crystals from the cooled solution.

IGNACE J. KRCHMA.
HOLGER H. SCHAUMANN.

REFERENCES CITED

The following references are of record in the file of this patent:

UNITED STATES PATENTS

| Number | Name | Date |
|---|---|---|
| 2,245,358 | Pechukas | June 10, 1941 |
| 2,387,228 | Arnold | Oct. 23, 1945 |